Aug. 30, 1966  J. R. ARTHUR  3,268,965

CABLE CLAMP

Filed May 11, 1964

INVENTOR
J. READ ARTHUR
BY
W. Robert Henderson
ATTORNEY

United States Patent Office 3,268,965
Patented August 30, 1966

3,268,965
CABLE CLAMP
John Read Arthur, Clarinda, Iowa, assignor to Lisle Corporation, Clarinda, Iowa, a corporation of Iowa
Filed May 11, 1964, Ser. No. 366,535
1 Claim. (Cl. 24—135)

This invention relates to the clamping or fastening of a cable to a more or less stationary object, and relates in particular to the type of cable clamp wherein a set screw is fastened against a flexible cable.

It has been found that the use of a conventional set screw cable clamp arrangement cuts or damages the flexible cable due to the screw physically contacting the cable. To utilize the set screw type of clamp, which is a most economical and practical clamp, but to obviate the resulting damage to the cable is an object of this invention.

It is another object of this invention to provide an improved cable clamp.

Yet another object of this invention is to provide a cable clamp utilizing a set screw for clamping a cable to a housing into which the screw is threaded, wherein the screw does not engage the cable.

Still another object of this invention is to provide a cable clamp wherein the wire of the cable is held firmly in place by the pressure of a set screw without damaging the cable.

It is another object of this invention to provide a cable clamp utilizing a piece of soft steel between a set screw within a housing and the cable which extends through the housing, whereby the screw mashes the soft steel against the cable for retaining same to the housing without damaging the cable.

Still another object of this invention is to provide an improved cable clamp capable of attaining all of the above designated objectives, which clamp is economical to produce, simple to use, and effective in operation.

These objects, and other features and advantages of this invention will become readily apparent upon reference to the following description, when taken with the accompanying drawings, wherein:

FIG. 2 is an enlarged, elevational view of the cable clamp of this invention, the view showing the clamp in full scale;

Figure 1:
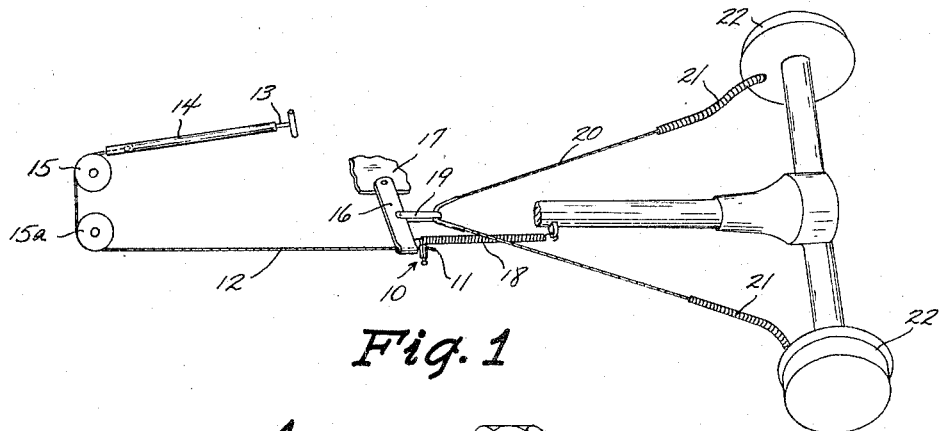
FIG. 1 is a fragmentary, schematic diagram of a hand brake arrangement for a vehicle, which illustrates the use of this invention.

Referring now to the drawings, the cable clamp of this invention is illustrated generally at 10 in FIG. 1, and is shown attached to one end 11 of a brake cable 12.

The brake cable 12 is threaded over a pair of pulleys 15 and 15a, for attachment to the inner end of a shaft 13 which is part of a hand brake unit 14.

The cable 12 is threaded through a passage formed in an outer end of a link 16 (FIG. 1) pivotally connected to a part of the frame 17 of the vehicle. The link 16 is maintained in a predetermined position by a spring 18 also attached to a stationary part of the vehicle.

By means of a pivotally connected arm 19, the brake cable 12 is operatively connected to a continuous cable 20 both ends of which are inserted into a pair of conduits 21 each of which lead to the rear wheels 22. This is a conventional arrangement for a hand brake emergency parking unit. Upon manipulation of the hand brake unit 14 to pull the brake cable 12 to the left as viewed in FIG. 1, so as to in turn pull the continuous cable 20 to the left, the cable clamp 10 is pulled up against the link 16, whereby the force on the cable 12 is transmitted against the spring 18 to the rear cable 20. Upon a release of the hand brake 14, the spring 18 brings the link 16 back to its original non-brake engaging position.

Figure 3:
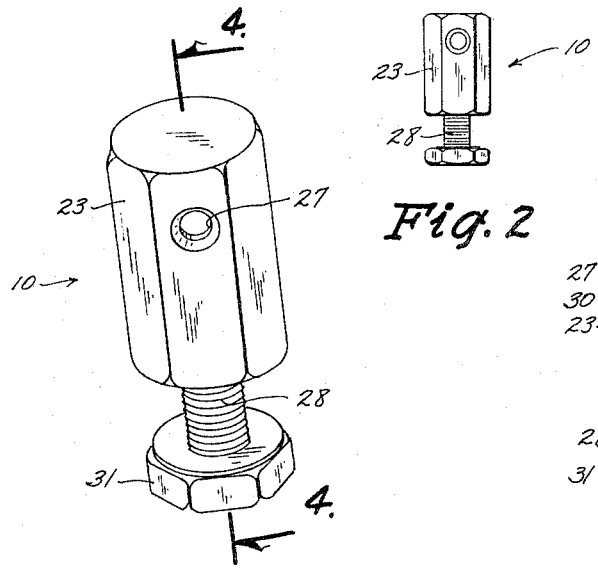
FIG. 3 is a further enlarged, perspective view of the cable clamp of this invention.
Figure 4:
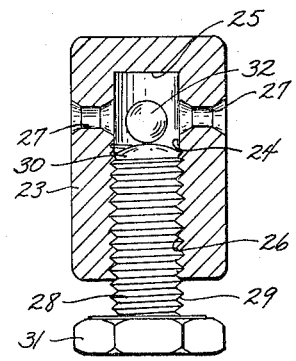
FIG. 4 is a sectional view taken along the longitudinal axis of the cable clamp, as viewed on the line 4—4 in FIG. 3.

The cable clamp 10 is illustrated in FIGS. 2–4 without the cable 12, and comprises a hexagonal housing 23 having a bore 24 formed along its longitudinal axis (FIG. 4), the outer portion 26 of which is internally threaded. A pair of transversely aligned passages 27 are formed through the housing 23 at the inner end 25 of the bore 24.

A set screw 28 is adapted to be threaded into the bore 24 by means of an externally threaded shank 29 the end 30 of which is rounded. The set screw 28 is provided with a hexagonal head 31. Within the bore 24, and held therein by the set screw 28, is a ball 32. The ball 32 is of the BB type, and may be of soft steel, lead, aluminum or plastic.

Figure 5:
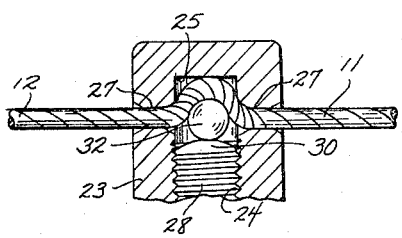
FIG. 5 is a fragmentary view of the upper part of the cable clamp, similar to that of FIG. 4, and showing a flexible cable retained by the clamp.

Use of the improved cable clamp is as follows. After cable 12 has been attached to the hand brake unit 14, threaded about the pulleys 15 and 15a, and inserted through the end provided therefor of the link 16, the cable end 11 (FIG. 5) is threaded through the transversely aligned passages 27. Prior to the threading of the cable 12, it is made certain that the set screw 28 and thus the ball 32 are backed off and away from the inner end 25 of the bore 24. Thus, the cable 12 can be threaded through the passages 27 so that the ball 32 is between the cable 12 and the set screw end 30. When this is accomplished, the set screw can be tightened down so that the ball 32 within the cable clamp housing 23 is forced against the cable 12. As best illustrated in FIG. 5, the flexible cable 12 will merely be distored and mashed against the ball 32, as compared to the conventional practice of forcing the inner end of the set screw 28 directly against the cable 12.

Although a preferred embodiment of this invention has been disclosed and described hereinbefore, it is to be remembered that various modifications and alternate constructions may be made thereto, without departing from the true spirit and scope of the invention, as defined in the appended claim.

I claim:

A cable clamp comprising in combination:

housing means having a polygonally formed exterior surface, and having internally a passage formed therethrough through which a flexible cable is adapted to pass, and having further a bore formed therein at substantially right angles to said passage and intersecting same;

said bore having a portion thereof threaded, said threaded portion disposed on one side of said passage, and having further an inner closed end disposed on the opposite side of said passage, the end of which is right angular in cross-section and the surface of which is completely smooth;

an externally threaded member inserted into said bore toward the closed inner end thereof, the inner end of said member being substantially smooth, the diameter of which is greater than the diameter of said threaded member; and a separate, spherical, deformable element placed within the said bore and engageable by the inner end of said member to engage in turn the cable, said element having a diameter approximately one-half the diameter of said bore and equal approximately to the depth of said inner closed end, said member threadable within said bore to force said element against the cable and toward the inner closed end of said bore.

References Cited by the Examiner
UNITED STATES PATENTS

| | | | |
|---|---|---|---|
| 531,784 | 1/1895 | Crosby | 24—125 X |
| 1,263,867 | 4/1918 | Davidson | 24—125 X |
| 1,423,203 | 7/1922 | Fiske | 24—135 X |
| 1,845,679 | 2/1932 | Parrish | 24—125 |
| 2,272,852 | 2/1942 | Schaefer. | |
| 2,300,913 | 11/1942 | Flaherty. | |
| 2,466,901 | 4/1949 | Krueger | 24—135 X |
| 2,643,146 | 6/1953 | Morse | 24—125 X |

FOREIGN PATENTS

| | | |
|---|---|---|
| 532,072 | 1/1922 | France. |
| 542,237 | 4/1956 | Italy. |

BERNARD A. GELAK, *Primary Examiner.*